G. T. WATT.
MOTOR VEHICLE LOCK.
APPLICATION FILED AUG. 30, 1920.
1,385,030.
Patented July 19, 1921.
2 SHEETS—SHEET 2.
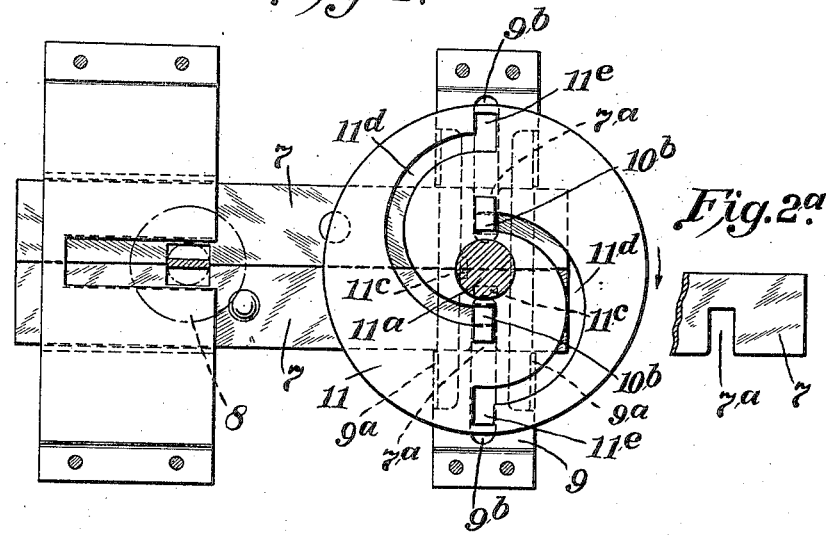
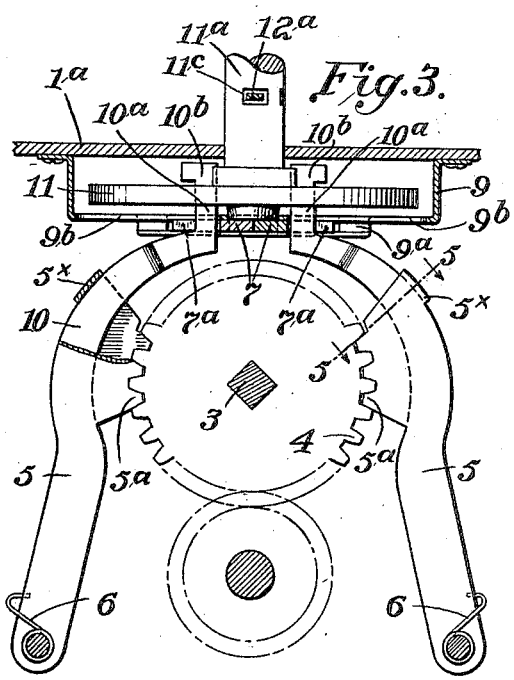
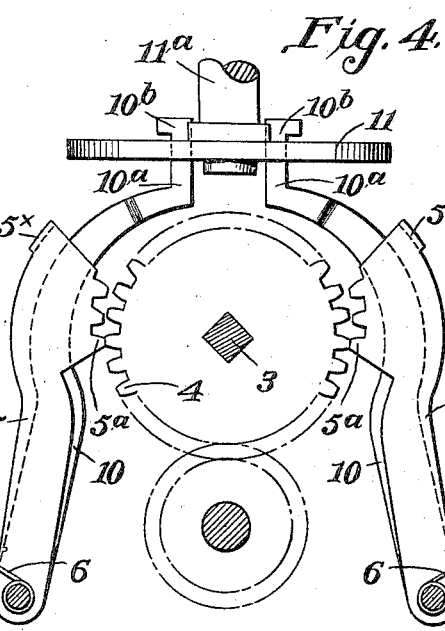
Inventor:
GLENN T. WATT,
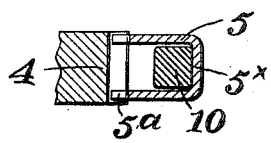
By Spear Middleton Donaldson & Hall
Attorneys.

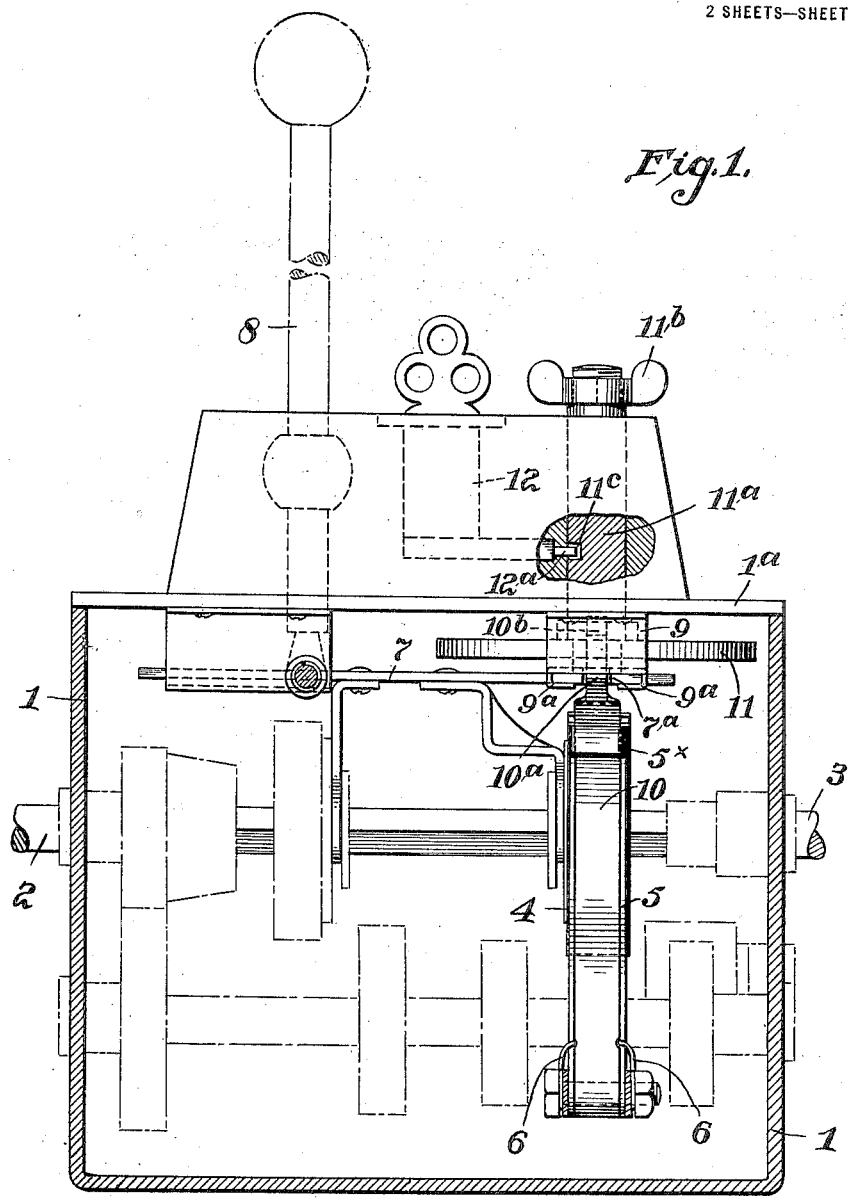

UNITED STATES PATENT OFFICE.

GLENN T. WATT, OF MINDEN, NEBRASKA.

MOTOR-VEHICLE LOCK.

1,385,030.  Specification of Letters Patent.  Patented July 19, 1921.

Application filed August 30, 1920. Serial No. 406,841.

*To all whom it may concern:*

Be it known that I, GLENN T. WATT, a citizen of the United States, and a resident of Minden, Kearney county, Nebraska, have invented certain new and useful Improvements in Motor-Vehicle Locks, of which the following is a specification.

My present invention relates to improvements in means for locking motor vehicles against movement by unauthorized persons and more specifically to locking means designed to coöperate with the transmission gearing.

The invention aims to provide a simple, economical, durable and efficient locking means which may be operated, when the gearing is in "neutral," to lock the propeller shaft against movement and also prevent the gear shift lever being operated whereby it will be impossible for an unauthorized person to move the car, either by towing or under its own power.

A further object is to provide a locking means of this character which may be so manipulated by the operator as to lock the gear shift mechanism against movement to prevent the car from being driven under its own power but at the same time leave it in condition to be towed, such being desirable at times as for instance where a car is disabled and must be left on the road until sent for by a garage or repair man.

With these and other objects in view the invention includes the novel features of construction and arrangement and combination of parts hereinafter described and particularly defined by the appended claims.

An embodiment of my invention is illustrated in the accompanying drawings in which—

Figure 1 is a vertical, longitudinal section through the casing of an ordinary transmission, with the gears dotted in diagrammatically, and with the locking device embodied therewith and shown in elevation.

Fig. 2 is a plan view of the operating cam and locking levers in engagement with the gear shifting slides.

Fig. 2ª is a detail plan view of a portion of one of the slides.

Fig. 3 is a transverse sectional view, with parts in elevation, showing the detent levers in locked relation with the gear.

Fig. 4 is a substantially similar view to Fig. 3, but with the detent levers resting upon the face of the gear teeth, under their spring tension, and Fig. 5 is a detail sectional view on line 5—5 of Fig. 3.

Referring by reference characters to these drawings the numeral 1 designates the gear case which is provided with a removable cover 1ª. The driving shaft or engine shaft is indicated at 2 and the propeller shaft at 3. Within the gear case and associated with the drive and propeller shafts are arranged the gears requisite for usual selective type of sliding gear transmission for securing the three speeds forward and reverse. It will be understood that the gear case and gearing shown is intended to be representative of the ordinary and well known type which is so thoroughly understood by those skilled in the art that a specific description thereof is deemed unnecessary apart from the reference to the individual parts which will occur in connection with the description of the locking mechanism. It will also be understood that my invention is not limited to the particular type of gearing shown, but is applicable to any desired form of transmission mechanism, that illustrated in the drawings being selected as typical of any desired form or construction.

In order to lock the propeller shaft against movement so that the car cannot be moved by any unauthorized person, either under its own power, or by towing, I associate with one of the gears, and preferably with the low gear pinion 4 which is slidably but non-rotatably held, on the propeller shaft, a pair of detent levers, 5, 5, pivoted to the inside of the gear case in any suitable manner and pressed toward the gear by springs 6, 6, so as to cause the teeth or projections 5ª to engage the teeth of the gear and lock the same against movement, thus holding the propeller shaft stationary and preventing the car from being moved, either under its own or external power. It will be observed that these detent levers are arranged to coact with the gear 4 when the gears are in neutral, and in order to simultaneously lock the gears in such neutral position I provide additional and coöperating detent means coacting with the gear shifting members.

These gear shifting members are shown as a pair of members 7, 7, which are arranged to be shiftable in a direction parallel with the propeller shaft, being selectively actuated by the shifting lever 8 in the customary manner, and being further provided with the customary gear shift forks. The gear shift members 7 are slidably supported and guided at their rear ends in the flanges 9ª of the bracket plate 9 secured to the under side of the cover plate, and are provided with notches 7ª which are designed to be engaged by the detent projections or portions 10ª of the detent levers 10 when the said shiftable members are in "neutral" position. The upper ends of the levers carry upwardly extending projections 10ᵇ which extend through transversely elongated slots 9ᵇ of the bracket plate 9. Lock controlled means are provided above the bracket plate and beneath the cover plate to manipulate the detent levers 10 and through them the detent levers 5 in the manner hereinafter described. Such means I prefer to form in the shape of a rotary cam disk 11 which is carried by or has a stem 11ª projecting up through and rotatably journaled in the cover plate, the stem being provided above the cover plate with a suitable handle for rotating it as indicated at 11ᵇ. The stem is provided with recesses 11ᶜ (full lines Fig. 1 and dotted Fig. 2) which are designed to be engaged by the locking bolt 12ª of a lock 12 of any approved construction, preferably a pin lock, located in the cover plate as indicated by dotted lines Fig. 1. The cam disk has two eccentric guideways 11ᵈ preferably in the shape of spiral slots as shown, oppositely disposed and extending from near the center toward the outer edge of the disk, which guide ways are engaged by the upwardly extending projections of the detent levers 10. Thus when the cam disk is rotated the detent levers will be moved toward each other to engage the notches in the shiftable members, or vice versa, according to the direction of rotation. In order to prevent the unauthorized removal of the cover plate the projections 10ᵇ are provided with enlarged or headed portions which overhang the walls of the slots in the cam disk and thus prevent the cam disk, and consequently the cover plate, from being raised except when the said projections lie in the outer ends of the slots which, at these points, are enlarged as indicated at 11ᵉ to permit the passage of said headed portions. Thus when the parts are in unlocked position the cover plate may be removed, but at all other times is locked in place.

The detent levers 5 are made independent of the detent levers 10 but are connected therewith to be operated thereby by a lost motion connection, so that if the gear 4 should stop in such position that the teeth or projections on the levers 5 should strike the ends of the teeth of the pinion instead of entering therebetween the levers 10 could still move forward under the action of the cam disk to lock the shiftable members, leaving the detent levers 5 under the action of their springs, ready to be forced into locking engagement with the teeth as soon as the pinion or gear starts to move. I prefer to accomplish this by making each detent lever 5 with an open center, or composed of two side bars between which the corresponding detent lever 10 is freely movable. A bridge piece or stop 5ˣ limits the outward movement of the lever 10 relative to the lever 5 so that when the lever 10 is moved outward into unlocking position it carries the lever 5 with it. Preferably the bars 5ˣ are made integral as shown in Fig. 5 to form channel-like portions in which the levers 10 lie, the inner edges of the detent levers being provided with a series of gear tooth engaging projections 5ª.

It is sometimes desirable to lock the gear shift lever without locking the propeller shaft, leaving the car in position to be towed, as for example when the car is disabled and must be left on the road to be sent for by the garage or repair man. My locking device enables this to be done by simply rotating the cam disk partially to bring the detent levers 10 into locking engagement with the gear shift members without moving the detent levers 5 far enough to engage the pinion 4, the cam disk being locked in this partially rotated position, the two recesses 11ᶜ providing for this.

Having thus described my invention what I claim is—

1. The combination with a change speed mechanism embodying sliding gears, of a pair of spring pressed detent levers arranged on opposite sides of one of said gears to engage the teeth thereof, a pair of actuating levers associated with said detent levers and having a lost motion connection therewith, manually controlled means for simultaneously moving said actuating levers, and a locking device for said manually controlled means.

2. The combination with a change speed mechanism having sliding gears, of a double walled detent lever pivoted to a fixed part in proximity to one of the gears, and having a detent to engage the teeth of one of the gears, a spring urging said detent lever toward the gear, an actuating lever lying between said walls and having limited motion in relation thereto, a cam arranged to move said actuating lever, means for moving said cam, and locking means for rendering said cam immovable.

3. The combination with a change speed mechanism having sliding gears, of a pivoted detent lever arranged to coöperate with one of the gears, a spring pressing said detent lever toward the gear, said lever being pivoted on an axis located below said gear and having an arc-shaped toothed portion to mesh with the teeth on the side of the gear, an actuating lever pivoted in proximity to the detent lever, coacting means between said levers whereby outward movement of said actuating lever moves the detent lever, said detent lever being movable toward the gear independently of the actuating lever, and said actuating lever having an upwardly projected upper end, a cam plate having a cam groove engaged by said projected upper end for moving said actuating lever, and means for locking said cam.

4. The combination with a change speed mechanism embodying sliding gears, of a pair of spring pressed detent levers arranged on opposite sides of one of said gears to engage the teeth thereof, a pair of actuating levers associated with said detent levers and having a lost motion connection therewith, a rotary cam disk located above said gear and having a pair of cam slots, said actuating levers having projections engaging said cam slots, means for actuating said cam disk, and means for locking said disk against movement.

5. In a transmission lock a gear case including sliding gears and a removable cover, a bracket plate secured to the under side of said cover, a cam disk rotatably mounted between said cover and bracket plate and having cam slots therein, locking levers having projections engaging said cam slots, said bracket plate having slots through which said projections pass, said projections having headed portions to overlie the walls of the cam slots, and said cam slots having enlarged portions to permit passage of the projections to permit removal of the cover, only when the cam disk is in unlocked position, and lock controlled means for actuating said cam disk.

6. The combination with a change speed mechanism having sliding gears, of shiftable members movable along parallel lines for shifting certain gears, a shifting lever for moving said members, said members having notches in their sides, a pair of detents for engaging said notches, a rotary cam disk having cam slots, said detents having projections engaging said cam slots, and lock controlled means for actuating said cam disk.

7. In a transmission lock a gear case including sliding gears and a removable cover, a bracket plate secured to the under side of said cover, a cam disk rotatably mounted between said cover and bracket plate and having cam slots therein, shiftable members movable along parallel lines for shifting certain gears, said shiftable members having notches in their edges, a lever for shifting said members, detent means for engaging said notches, said detent means having projections engaging said cam slots, said projections having headed portions overlying the cam slots, and said cam slots having enlarged portions to permit the passage of said headed portions, and lock controlled means for actuating said cam disk.

8. In a transmission lock a gear case including sliding gears, shiftable members movable along parallel lines to shift certain of the gears, a lever for actuating said members, said shiftable members having notches in their edges, detent means arranged to engage one of the gears and also said notches, and lock controlled means for actuating said detent means.

9. In a transmission lock including sliding gears and shiftable members movable along parallel lines for sliding certain of the gears, detent means coöperating with said shiftable members and one of said gears, and means whereby said detent means may be operated to hold said shiftable members only against movement, or to hold both the gear and said shiftable members against movement.

10. In a transmission lock including sliding gears and shiftable members movable along parallel lines to actuate certain of said gears, said shiftable members having notches, a pair of detent levers having portions to engage said notches, a pair of spring pressed levers having portions to engage the teeth of one of the gears, lock controlled means for actuating said detent levers, and means whereby the movement of said detent levers effects movement of said spring pressed levers.

In testimony whereof I affix my signature.

GLENN T. WATT.